(12) United States Patent
Marking et al.

(10) Patent No.: US 7,419,621 B2
(45) Date of Patent: Sep. 2, 2008

(54) UV-EMITTING PHOSPHOR AND LAMP CONTAINING SAME

(75) Inventors: Gregory A. Marking, Sayre, PA (US); Thomas M. Snyder, Laceyville, PA (US)

(73) Assignee: Osram Sylvania Inc., Danvers, MA (US)

( * ) Notice: Subject to any disclaimer, the term of this patent is extended or adjusted under 35 U.S.C. 154(b) by 333 days.

(21) Appl. No.: 11/308,099

(22) Filed: Mar. 7, 2006

(65) Prior Publication Data

US 2007/0221883 A1    Sep. 27, 2007

(51) Int. Cl.
*C09K 11/64* (2006.01)
*C09K 11/55* (2006.01)
*H01J 1/62* (2006.01)
*H01J 11/02* (2006.01)
*H01J 61/16* (2006.01)

(52) U.S. Cl. .............................. 252/301.4 R; 313/486; 313/643; 313/637

(58) Field of Classification Search .......... 252/301.4 R; 313/486, 643, 637
See application file for complete search history.

(56) References Cited

U.S. PATENT DOCUMENTS

| 4,319,161 | A | | 3/1982 | Looye et al. ............... 313/486 |
|---|---|---|---|---|
| 5,140,604 | A | * | 8/1992 | Alablanche et al. ........... 372/41 |
| 5,557,112 | A | | 9/1996 | Csoknyai et al. ......... 250/504 R |
| 5,571,451 | A | | 11/1996 | Srivastava et al. ..... 252/301.4 R |
| 6,007,741 | A | | 12/1999 | Hunt, Jr. et al. ....... 252/301.4 R |
| 6,246,171 | B1 | | 6/2001 | Vollkommer et al. ........ 313/586 |
| 6,398,970 | B1 | | 6/2002 | Jüstel et al. .................. 210/748 |
| 6,469,435 | B1 | | 10/2002 | Seibold et al. .............. 313/493 |
| 6,566,810 | B1 | | 5/2003 | Seibold et al. .............. 313/582 |
| 6,613,248 | B2 | | 9/2003 | Setlur et al. ........... 252/301.4 R |
| 2003/0011310 | A1 | | 1/2003 | Juestel et al. ................ 313/640 |
| 2004/0021407 | A1 | | 2/2004 | Baillie et al. ................. 313/111 |
| 2006/0220519 | A1 | | 10/2006 | Fan et al. ..................... 313/486 |
| 2006/0273710 | A1 | | 12/2006 | Marking et al. ............. 313/486 |

FOREIGN PATENT DOCUMENTS

| EP | 1 571 692 A2 | 9/2005 |
|---|---|---|
| HU | 221574 B1 | 11/2002 |
| WO | WO 2004/066334 A2 | 8/2004 |

OTHER PUBLICATIONS

A. Srivastava et al., Luminescence of $Pr^{3+}$ in $SrAl_{12}O_{19}$: Observation of two photon luminescence in oxide lattice, *J. Luminescence*, 71 (1997) 285-290.

* cited by examiner

*Primary Examiner*—C. Melissa Koslow
(74) *Attorney, Agent, or Firm*—Robert F. Clark

(57) ABSTRACT

A UV-emitting phosphor is described wherein the phosphor is excitable by vacuum ultraviolet radiation (VUV). The phosphor is a gadolinium-activated strontium magnesium aluminate which preferably has an excitation maximum at about 172 nm. The phosphor exhibits a narrow-band UV emission at about 310 nm which makes it useful for medical phototherapy applications.

9 Claims, 4 Drawing Sheets

UV-EMITTING PHOSPHOR AND LAMP CONTAINING SAME

TECHNICAL FIELD

This invention is related to phosphors that emit ultraviolet (UV) radiation and lamps containing UV-emitting phosphors. More particularly, this invention is related to phosphors that emit UV radiation when stimulated by vacuum ultraviolet (VUV) radiation.

BACKGROUND OF THE INVENTION

The use of ultraviolet (UV) radiation for medical phototherapy is well established. In fact, UV therapy is now involved in the treatment of more than 40 types of skin diseases and disorders such as psoriasis, vitiligo and eczema. Phototherapy studies of UVB wavelengths between 260 nm and 320 nm have found that a narrow-band UVB emission centered at approximately 312 nm is most effective for phototherapy while at the same time limiting undesirable erythemal effects. Since the skin's erythemal (or sunburning sensitivity) is at its maximum at about 297 nm, a narrow-band emission at about 312 nm allows a patient to have longer treatment times before an erythemal response appears.

The $Gd^{3+}$ $^6P_{7/2} \rightarrow ^8S$ transitions are ideal for 312 nm narrow-band emissions. However, f-f transitions of rare earths, being parity forbidden, are very weak and the use of a sensitizer is necessary to obtain a useful emission intensity. One of the first narrow-band UVB phosphors to be developed was sensitized with bismuth, e.g., $(Gd_{0.5},La_{0.487})B_3O_6:Bi_{0.013}$. On excitation by 254 nm radiation, this borate phosphor emits the characteristic radiation with a very narrow band centered on 312 nm. However, because of the toxicity of the bismuth sensitizer, other narrow-band UVB phosphors were developed, in particular $YMgB_5O_{10}:Gd,Ce$ (U.S. Pat. Nos. 4,319, 161 and 6,007,741), and $YMgB_5O_{10}:Gd,Ce,Pr$ (U.S. patent application Ser. No. 10/907,349, filed Mar. 30, 2005).

For the most part, UV-emitting phosphors have been optimized for excitation by the 254 nm emission of the low-pressure mercury discharge used in conventional fluorescent lighting. However, because of environmental concerns, there is a growing need for mercury-free lighting technologies. One such technology is the xenon discharge lamp which produces radiation at about 172 nm in the vacuum ultraviolet (VUV) region of the electromagnetic spectrum. It would be advantageous to develop phosphors which are optimized for excitation in the VUV region and could be used in a Xe-discharge lamp for medical phototherapy.

SUMMARY OF THE INVENTION

Cerium-activated strontium magnesium aluminate, $Sr(Al,Mg)_{12}O_{19}:Ce$, is a commercial UVB-emitting phosphor used in suntan lamps as a minor component to increase the tanning efficiency of such lamps and reduce the time needed to obtain a tan of the desired level. This phosphor is excited by 254 nm radiation and has a broad band emission centered approximately at 307 nm.

The amount of $Ce^{3+}$ activator substituted for strontium on the $Sr^{2+}$ sites is counterbalanced by substituting a similar amount of $Mg^{2+}$ for aluminum on the $Al^{3+}$ sites leading approximately to charge balance. In addition to and beyond the benefit of charge balancing, the presence of an optimum $Mg^{2+}$ level in the phosphor lattice is thought to be necessary for maximum light output. Most of the rare earth 3+ ions have similar atomic and ionic radii, and it was thought that other rare earth 3+ ions could replace cerium in the phosphor lattice as in, for example, the quantum-splitting phosphor $Sr(Al,Mg)_{12}O_{19}:Pr$ which is described in U.S. Pat. Nos. 5,571,451 and 6,613,248 and U.S. application Ser. No. 11/160,052, filed Jun. 7, 2005.

The inventors discovered that when strontium magnesium aluminate is activated with gadolinium a narrow-band UV line emission is observed at about 310 nm. This is a slightly lower wavelength than exhibited by the above-mentioned yttrium magnesium pentaborate phosphors, but it is still close to the optimal wavelength for medical phototherapy. The UV emission intensity of this phosphor is very weak under 254 nm excitation, however, under VUV excitation, the emission intensity is significantly greater than the commercial yttrium magnesium pentaborate phosphors. Thus, the phosphor of this invention may be used in a Xe-discharge lamp to provide a mercury-free lamp for medical phototherapy.

The composition of the gadolinium-activated strontium magnesium aluminate phosphor of this invention may be generally represented by the formula, $Sr(Al,Mg)_{12}O_{19}:Gd$. In a preferred embodiment, the phosphor may be represented by the formula, $Sr_{1-x}Gd_xAl_{12-y}Mg_yO_{19}$, where x ranges from about 0.03 to about 0.15 and y ranges from greater than 0 to about 0.2. More preferably, y ranges from x−0.02 to x+0.02 for optimal charge balance. A more preferred value for x is about 0.07. It is possible to include additional coactivators such as Ce and Pr to increase the phosphor's sensitivity to 254 nm radiation. However, these coactivators tend to decrease the VUV-excited emission and are therefore less preferred.

In addition, the gadolinium-activated strontium magnesium aluminate phosphor can easily be prepared using dry blending and a single firing step, whereas the yttrium magnesium pentaborate phosphors are prepared through a more complicated process of precipitation and double firing.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

Figure 1:
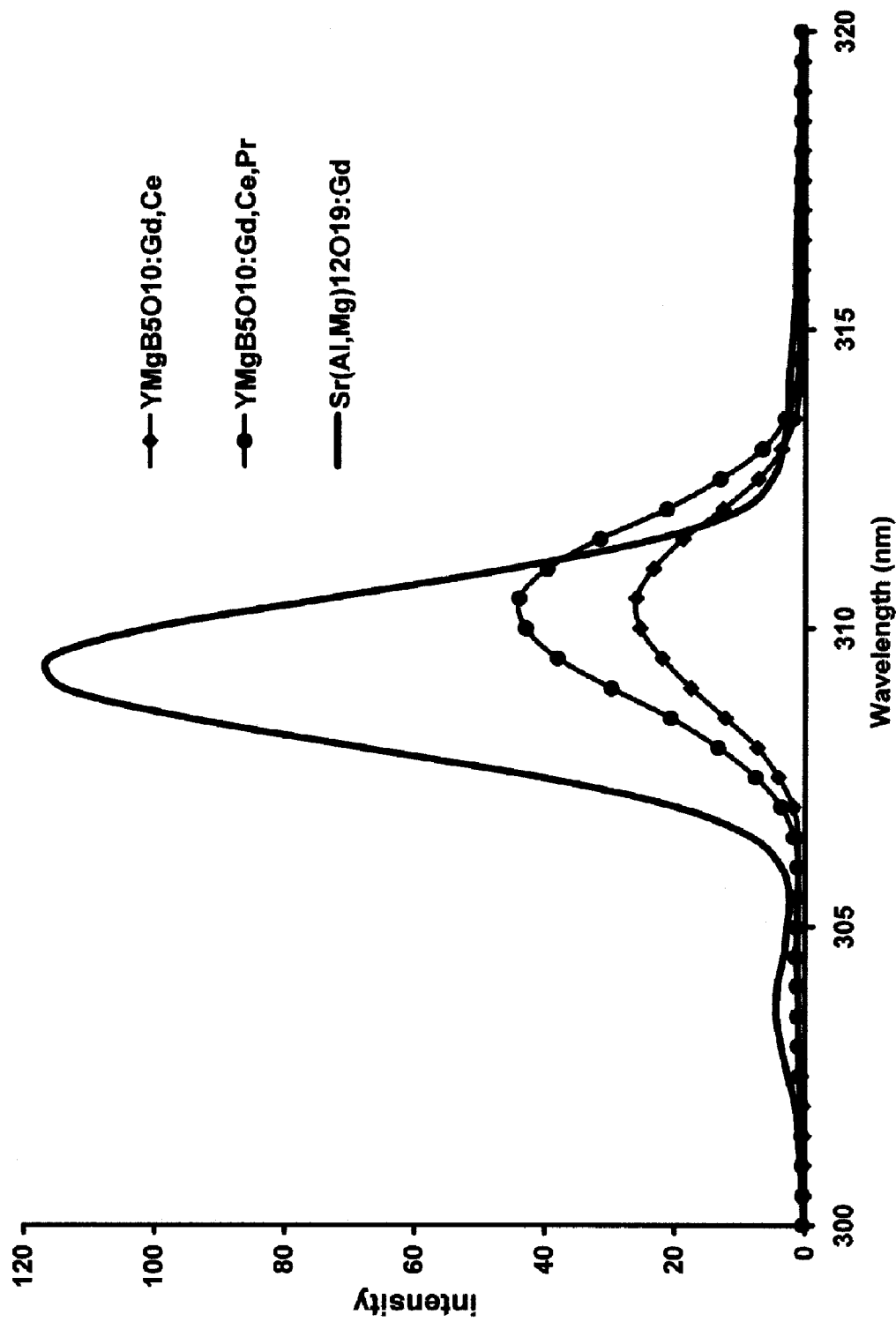
FIG. 1 is a graph comparing the UV emission of the phosphor of this invention with two yttrium magnesium pentaborate phosphors.

FIG. 1 shows the VUV-excited emission spectra between 300 nm and 320 nm of a $Sr(Al,Mg)_{12}O_{19}:Gd$ phosphor and two 312 nm line emitting phosphors, $YMgB_5O_{10}:Gd, Ce$ and $YMgB_5O_{10}:Gd, Ce, Pr$. Under VUV-excitation, the $Sr(Al,Mg)_{12}O_{19}:Gd$ phosphor of this invention exhibits a much more intense UV line emission in the region of interest for medical phototherapy.

Figure 2:
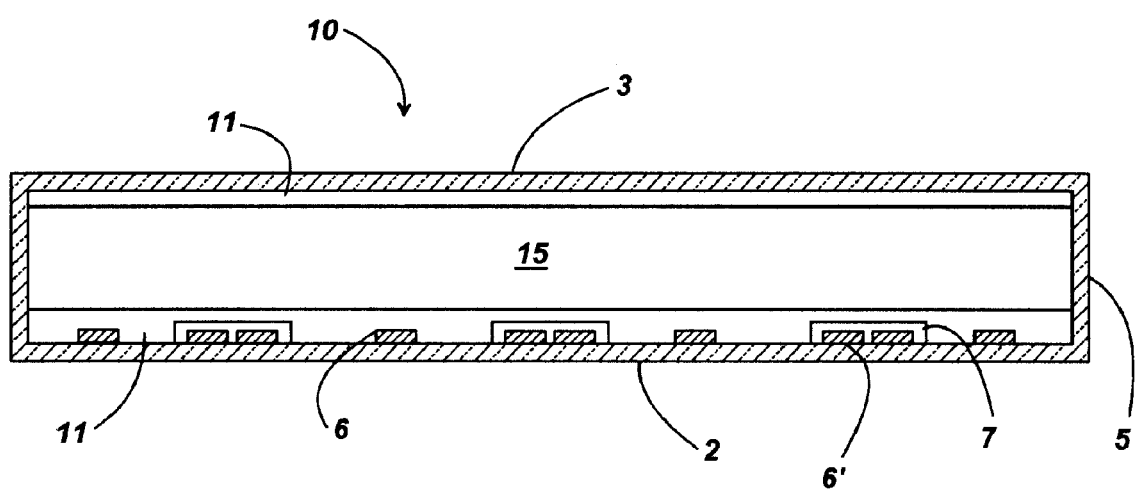
FIG. 2 is a cross-sectional illustration of a lamp containing the phosphor of this invention.

FIG. 2 illustrates a type of VUV-excited device which is generally referred to as a dielectric barrier discharge lamp. The flat rectangular-shaped device is shown in cross section. The discharge vessel 10 is constructed of a transparent material such as glass and comprises a front plate 3 and a back plate 2 which are joined by frame 5 at the periphery of the plates. The discharge vessel 10 encloses discharge chamber 15 which contains a rare gas, typically xenon, or mixture of rare gases, and is used to generate a discharge which emits vacuum ultraviolet (VUV) radiation. A preferred discharge is a Xe-excimer discharge which emits VUV radiation at about 172 nm. The back plate 2 has multiple strip electrodes 6 which may serve as anodes and cathodes during operation. At least some of the electrodes 6' are covered with a dielectric barrier layer 7. Further examples of dielectric barrier discharge lamps are described in U.S. Pat. Nos. 6,566,810, 6,246,171 and 6,469,435.

A UV-emitting lamp may be formed by coating the inner surface of the top plate 3 and back plate 2 with a phosphor layer 11 that contains the UV-emitting phosphor of this invention. The UV-emitting phosphor converts at least some of the VUV radiation from the gas discharge into longer wavelength UV radiation. In a preferred embodiment, the lamp produces a narrow-band UV line emission at about 310 nm which may be used for medical phototherapy.

The $Sr(Al,Mg)_{12}O_{19}$:Gd phosphor may be prepared by thoroughly dry blending the appropriate metal oxides, hydroxides, carbonates, and halides, then firing the blended material in a reducing atmosphere, preferably 75% $H_2$-25% $N_2$, for a time and temperature sufficient to form the phosphor, preferably at least about 1.5 hours at a temperature between about 1500° C. and about 1600° C. The fired material may be sifted and further processed with water and/or chemical washing and milling steps before it is dried and sifted for lamp use. Chemical precipitation techniques may also be used to prepare a thorough mixture in lieu of dry blending.

EXAMPLES

Table 1 lists the reagents, their assays, their formula weights, and the quantities used for inventive samples 1-11. Each sample was formulated to contain 0.083 moles Mg/mole phosphor. Depending on the amount of activator, it may be necessary to adjust the amount of Mg in the formulation to obtain optimal charge compensation and brightness. Such adjustments are well within the capabilities of one skilled in the art in view of the present disclosure. In a preferred embodiment, the amount of magnesium in the phosphor ranges from greater than 0 to about 0.2 moles Mg/mole of phosphor.

The materials were weighed, added to a 500 ml plastic bottle, and then thoroughly blended on a paint shaker. The blended materials were then loaded into 100 ml alumina crucibles and fired for 2 hrs at 1550° C. in a continuous furnace under a reducing atmosphere of 75% $H_2$/25% $N_2$. The fired phosphors were then screened through a −60 mesh nylon screen and measured for their emission properties under VUV excitation.

TABLE 1

| Sample | $SrCO_3$ | $SrF_2$ | $Pr_4O_7$ | MgO | $Gd_2O_3$ | $CeO_2$ | $Al(OH)_3$ |
|---|---|---|---|---|---|---|---|
| Assay | 0.997 | 0.995 | 1.000 | 0.994 | 0.995 | 1.000 | 0.996 |
| Formula Wt. (g/mol) | 147.630 | 127.620 | 675.63 | 40.304 | 362.500 | 172.120 | 78.003 |
| 1 | 19.26 g | 7.95 g | 0.34 g | 0.67 g | 1.09 g | 0.34 g | 186.70 g |
| 2 | 18.67 g | 7.95 g | 0.34 g | 0.67 g | 1.82 g | 0.34 g | 186.70 g |
| 3 | 18.97 g | 7.95 g | 0 | 0.67 g | 1.82 g | 0.34 g | 186.70 g |
| 4 | 18.08 g | 7.95 g | 0.34 g | 0.67 g | 2.55 g | 0.34 g | 186.70 g |
| 5 | 18.97 g | 7.95 g | 0.34 g | 0.67 g | 1.82 g | 0 | 186.70 g |
| 6 | 18.37 g | 7.95 g | 0.17 g | 0.67 g | 2.55 g | 0.17 g | 186.70 g |
| 7 | 17.49 g | 7.95 g | 0 | 0.67 g | 4.01 g | 0 | 186.70 g |
| 8 | 16.30 g | 7.95 g | 0 | 0.67 g | 5.46 g | 0 | 186.70 g |
| 9 | 18.08 g | 7.95 g | 0 | 0.67 g | 3.28 g | 0 | 186.70 g |
| 10 | 19.26 g | 7.95 g | 0 | 0.67 g | 1.82 g | 0 | 186.70 g |
| 11 | 18.67 g | 7.95 g | 0 | 0.67 g | 2.55 g | 0 | 186.70 g |

The UV line emissions of the samples were measured with a Perkin-Elmer LS-50B model spectrophotometer, which had been modified with a nitrogen-purged sample chamber and fitted with a Xe lamp for vacuum ultraviolet excitation. The excitation source is a commercially available xenon excimer lamp (XeCM-L from Resonance, Ltd., Barrie, Ontario, Canada) used to illuminate powder plaques while excluding air from the VUV beam path. This particular lamp has a very intense sharp Xe emission line at 147 nm and a broad, much less intense Xe excimer band emission at about 172 nm. Table 2 gives the formulated amounts of the activators in samples 1-11 in moles of activator/mole of phosphor and the resulting relative integrated intensities of their UV line emission between 305-315 nm. Two yttrium magnesium borate phosphors were also measured as controls. The integrated intensities are given relative to Control 1.

TABLE 2

| Sample | Gd | Ce | Pr | Rel. Intensity |
|---|---|---|---|---|
| Control 1- $YMgB_5O_{10}$: Gd, Ce | NA | NA | NA | 100% |
| Control 2- $YMgB_5O_{10}$: Gd, Ce, Pr | NA | NA | NA | 169% |
| 1 | 0.03 | 0.01 | 0.01 | 148% |
| 2 | 0.05 | 0.01 | 0.01 | 226% |
| 3 | 0.05 | 0.01 | 0 | 236% |
| 4 | 0.07 | 0.01 | 0.01 | 257% |
| 5 | 0.05 | 0 | 0.01 | 292% |
| 6 | 0.07 | 0.005 | 0.005 | 302% |
| 7 | 0.11 | 0 | 0 | 335% |
| 8 | 0.15 | 0 | 0.01 | 335% |
| 9 | 0.09 | 0 | 0 | 350% |
| 10 | 0.05 | 0 | 0 | 384% |
| 11 | 0.07 | 0 | 0 | 437% |

Figure 3:
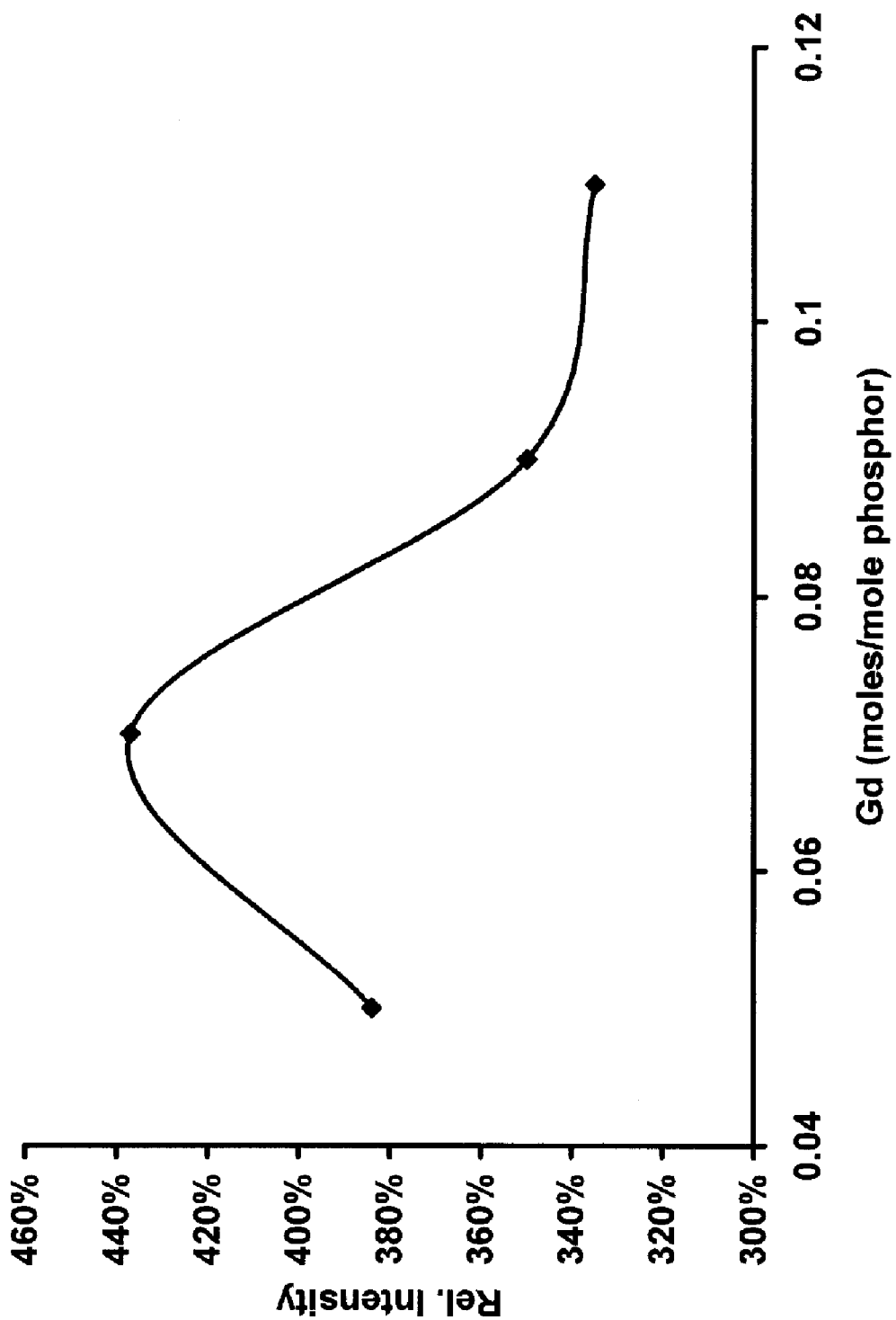
FIG. 3 is a graph of the relative intensity of the ultraviolet emission of the phosphor of this invention as a function of the amount of the gadolinium activator.

The amount of gadolinium that yielded the maximum emission intensity was approximately 0.07 moles Gd/mole phosphor, but all levels between 0.03 and 0.15 moles Gd/mole phosphor yielded a relatively good emission intensity. The addition of Ce and Pr coactivators tended to reduce the intensity of the UV line emission under VUV excitation. The effect of the amount of Gd activator alone on the emission intensity is shown in FIG. 3 which is a plot of the relative intensity for samples 7 and 9-11 (no coactivators).

Figure 4:
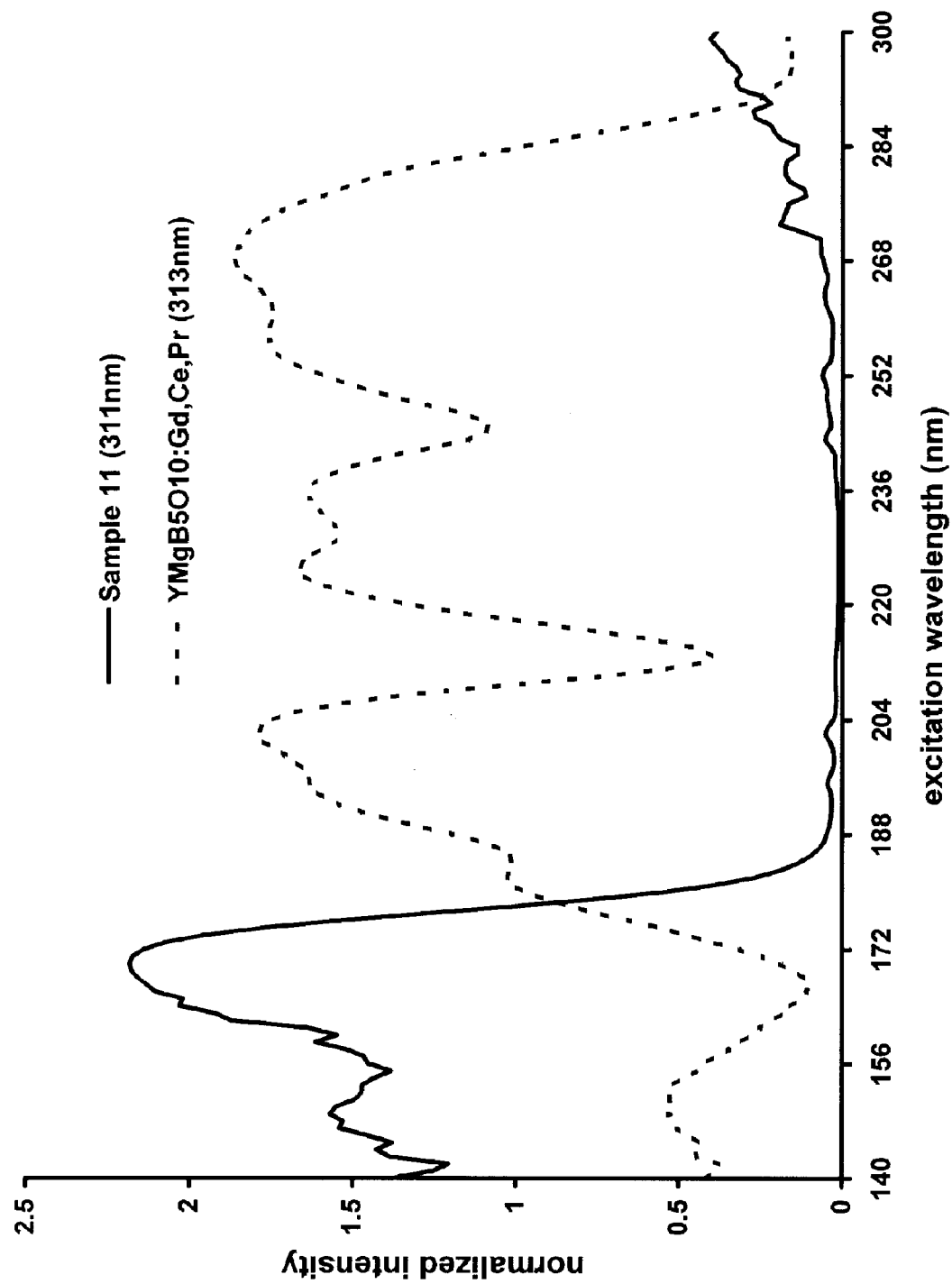
FIG. 4 is a graph of the excitation spectra of the phosphor of this invention compared with a yttrium magnesium borate phosphor.

The excitation spectrum of sample 11 is shown in FIG. 4 together with the excitation spectrum of a YMgB$_5$O$_{10}$:Gd,Ce,Pr phosphor. For sample 11, the intensity of the UV emission at 311 nm was observed while the excitation wavelength was varied. For the YMgB$_5$O$_{10}$:Gd,Ce,Pr phosphor, the intensity of the UV emission at 313 nm was used. In both cases, the intensity of the UV emission was normalized to the intensity of the excitation wavelength. It can be seen in FIG. 4 that the excitation maximum for the Sr(Al,Mg)$_{12}$O$_{19}$:Gd phosphor occurs at about 172 nm which makes it ideal for use with a Xe-excimer discharge. There is also significant excitation down to at least 140 nm making the phosphor useable with other VUV wavelengths. On the other side of the maximum, there is virtually no excitation of the phosphor above about 188 nm. Almost the opposite is true for the YMgB$_5$O$_{10}$:Gd,Ce,Pr phosphor. The level of excitation below about 180 nm is significantly less than the excitation at about 254 nm. This means that the yttrium magnesium borate phosphor would not be nearly as effective as the Sr(Al,Mg)$_{12}$O$_{19}$:Gd phosphor when used with a VUV source such as a Xe-excimer discharge.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A UV-emitting lamp comprising a discharge vessel containing a source of vacuum ultraviolet radiation and a UV-emitting phosphor on an interior wall of the discharge vessel, the UV-emitting phosphor comprising gadolinium-activated strontium magnesium aluminate.

2. The UV-emitting lamp of claim 1 wherein the source of vacuum ultraviolet radiation is a xenon excimer discharge.

3. The UV-emitting lamp of claim 2 wherein the discharge vessel has dielectrically impeded electrodes.

4. The UV-emitting lamp of claim 1 wherein the phosphor is represented by a formula Sr$_{1-x}$Gd$_x$Al$_{12-y}$Mg$_y$O$_{19}$, where x ranges from about 0.03 to about 0.15 and y ranges from greater than 0 to about 0.2.

5. The UV-emitting lamp of claim 2 wherein the phosphor has an excitation maximum at about 172 nm.

6. The UV-emitting lamp of claim 4 wherein y ranges from x−0.02 to x+0.02.

7. The UV-emitting lamp of claim 4 wherein x is about 0.07.

8. The UV-emitting lamp of claim 1 wherein the phosphor contains magnesium in an amount from greater than 0 to about 0.2 moles Mg per mole of phosphor.

9. The UV-emitting lamp of claim 1 wherein the phosphor is coactivated with at least one of Ce and Pr.

* * * * *